US009667619B1

(12) United States Patent
Vera-Schockner

(10) Patent No.: US 9,667,619 B1
(45) Date of Patent: May 30, 2017

(54) SYSTEMS AND METHODS FOR UTILIZING CLIENT SIDE AUTHENTICATION TO SELECT SERVICES AVAILABLE AT A GIVEN PORT NUMBER

(71) Applicant: Akamai Technologies, Inc., Cambridge, MA (US)

(72) Inventor: Simon E. Vera-Schockner, Reston, VA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 15/293,481

(22) Filed: Oct. 14, 2016

(51) Int. Cl.
*H04L 29/06* (2006.01)
*H04L 29/08* (2006.01)

(52) U.S. Cl.
CPC ...... *H04L 63/0823* (2013.01); *H04L 63/0272* (2013.01); *H04L 63/10* (2013.01); *H04L 63/1433* (2013.01); *H04L 63/166* (2013.01); *H04L 67/02* (2013.01); *H04L 67/42* (2013.01)

(58) Field of Classification Search
CPC ... H04L 63/0823; H04L 67/42; H04L 63/166; H04L 63/10; H04L 67/02; H04L 63/0272; H04L 63/1433
See application file for complete search history.

(56) References Cited

U.S. PATENT DOCUMENTS

| | | |
|---|---|---|
| 4,105,156 A | 8/1978 | Dethloff et al. |
| 5,774,660 A | 6/1998 | Brendel et al. |
| 6,108,703 A | 8/2000 | Leighton et al. |
| 6,182,139 B1 | 1/2001 | Brendel et al. |
| 6,820,133 B1 | 11/2004 | Grove et al. |
| 7,111,057 B1 | 9/2006 | Wein et al. |
| 7,240,100 B1 | 7/2007 | Wein et al. |
| 7,274,658 B2 | 9/2007 | Bornstein et al. |

(Continued)

FOREIGN PATENT DOCUMENTS

| | | |
|---|---|---|
| EP | 1687951 A1 | 8/2006 |
| WO | 2015100283 A1 | 7/2015 |

OTHER PUBLICATIONS

IBM, z/Os Communications Server, IP Configuration Guide, Version 1 Release 13, Apr. 2112, pp. 134-139 (8 total pages).*

(Continued)

*Primary Examiner* — Michael Pyzocha

(57) ABSTRACT

Typically, clients request a service from a computer hosting multiple services by specifying a destination port number associated with the desired service. In embodiments, the functionality of such a host computer is enhanced by having it condition client access to services available at a particular port number based on client authentication and/or authorization. A host computer can change the service(s) available at a given port number on a client by client basis, enabling access to service(s) for trusted clients unavailable to untrusted clients. Preferably, client trust is based on client authentication via a certificate and a valid, signed transport layer security (TLS) handshake (or similar mechanism in other protocol contexts). In some embodiments, an authorization step can be added following authentication. The systems and methods disclosed herein find wide uses in bundling services on ports, as well as protecting access to services from untrusted and/or malicious clients, among others.

20 Claims, 8 Drawing Sheets

(56) References Cited

U.S. PATENT DOCUMENTS

| | | | |
|---|---|---|---|
| 7,296,082 | B2 | 11/2007 | Leighton et al. |
| 7,305,429 | B2 | 12/2007 | Borella et al. |
| 7,313,631 | B1 | 12/2007 | Sesmun et al. |
| 7,376,716 | B2 | 5/2008 | Dilley et al. |
| 7,472,178 | B2 | 12/2008 | Rose et al. |
| 7,660,296 | B2 | 2/2010 | Fletcher et al. |
| 7,661,131 | B1 | 2/2010 | Shaw et al. |
| 7,698,458 | B1 | 4/2010 | Liu et al. |
| 7,747,730 | B1* | 6/2010 | Harlow ............... H04L 12/2697 709/202 |
| 8,078,755 | B1 | 12/2011 | Liu et al. |
| 8,560,834 | B2 | 10/2013 | Lau |
| 8,584,214 | B2* | 11/2013 | Upp .................. G06F 21/33 380/200 |
| 8,688,817 | B2 | 4/2014 | Hartrick et al. |
| 8,875,287 | B2 | 10/2014 | Ludin et al. |
| 2003/0056002 | A1 | 3/2003 | Trethewey |
| 2004/0260745 | A1 | 12/2004 | Gage et al. |
| 2009/0222901 | A1* | 9/2009 | Schneider ............ G06F 21/33 726/10 |
| 2009/0287920 | A1* | 11/2009 | Fernandez ........... H04L 63/0428 713/151 |
| 2011/0173345 | A1 | 7/2011 | Knox et al. |
| 2012/0254372 | A1* | 10/2012 | Vandendorpe ........ H04L 67/42 709/220 |
| 2013/0254343 | A1 | 9/2013 | Stevens et al. |
| 2014/0068707 | A1* | 3/2014 | Sakura ............... H04L 63/0892 726/1 |
| 2016/0014142 | A1* | 1/2016 | Wang ................. H04L 12/6418 726/4 |
| 2016/0035183 | A1* | 2/2016 | Buchholz ............ G07F 17/3225 463/25 |
| 2016/0241528 | A1* | 8/2016 | Kulkarni ............ H04L 67/2842 |
| 2016/0337134 | A1* | 11/2016 | Robert ............... G06Q 30/0257 |

OTHER PUBLICATIONS

Parsovs, Arnis "Practical Issues with TLS Client Certificate Authentication", NDSS '14, Feb. 23-26, 2014, San Diego, CA, USA, pp. 1-13.*

Netfilter/iptables—Patch-o-Matic Listing—external, copyright date for page listed as 1999-2010, available at http://www.netfilter.org/projects/patch-o-matic/pom-external.html, 6 pages, downloaded prior to filing date.

Cyberoam Knowledge Base, https://kb.cyberoam.com/print.asp?id=36, , downloaded on Aug. 19, 2016, 15 pages.

Cyberroam Knowledge Base, https://kb.cyberoam.com/default.asp?id=393, downloaded on Jul. 26, 2016, 7 pages.

Man page for tarpit extension for xtables-addons release 1.45, available at http://sourceforge.net/p/xtables-addons/xtables-addons/ci/v1.45/tree/extensions/libxt_TARPIT.man,dated May 31, 2011, 2 pages.

RFC: 793, Transmission Control Protocol, DARPA Internet Program Protocol Specification , Information Sciences Institute, University of Southern California, Sep. 1981, 90 pages.

Service Name and Transport Protocol Port Number Registry, http://www.iana.org/assignments/servicenamesportnumbers/servicenamesportnumbers.xhtml,downloaded Sep. 12, 2016, last updated Sep. 12, 2016, 4 pages.

Wikipedia, Common Access Card, https://en.wikipedia.org/wiki/Common_Access_Card , downloaded on Aug. 29, 2016, 6 pages.

Wikipedia, Public key certificate,https://en.wikipedia.org/w/index.php?title=Public_key_certificate, downloaded Oct. 10, 2016, 6 pages.

Wikipedia, Public Key infrastructure, https://en.wikipedia.org/wiki/Public_key_infrastructure , downloaded Oct. 10, 2016, 6 pages.

Wikipedia, Public-Key cryptography, https://en.wikipedia.org/wiki/Publickey_cryptography, downloaded Oct. 10, 2016, 14 pages.

Wikipedia, Smart Card, https://en.wikipedia.org/wiki/Smart_card , downloaded Aug. 29, 2016, 11 pages.

Wikipedia, TCP/IP stack fingerprinting, https://en.wikipedia.org/wiki/TCP/IP_stack_fingerprinting , downloaded on Aug. 29, 2016, 3 pages.

Xtables-addons file listing for release 1.45, available at http://sourceforge.net/p/xtables-addons/xtables-addons/ci/v1.45/tree/, downloaded Jun. 26, 2013, 3 pages.

Xtables-addons page, referring to version 1.27, dated Feb. 5, 2011, available at http://xtables-addons.sourceforge.net/modules.php, 1 page.

Bishop, M. et al., IETF, Secondary Certificate Authentication in HTTP/2, draft-bishop-httpbis-http2-additional-certs-01, May 17, 2016, 27 pages.

Cooper, D. et al., IETF, RFC:5280, Network Working Group, Internet X.509 Public Key Infrastructure Certificate , and Certificate Revocation List (CRL) Profile, May 2008, 151 pages.

Cotton, M., IETF, RFC: 6335, Internet Engineering Task Force (IETF), Internet Assigned Numbers Authority (IANA) Procedures for the Management , of the Service Name and Transport Protocol Port Number Registry, http://www.rfc-editor.org/info/rfc6335, Aug. 2011, 33 pages.

Dierks, T., et al., IETF, RFC: 5246, Network Working Group, The Transport Layer Security (TLS) Protocol Version 1.2 , Aug. 2008, 104 pages.

Engelhardt, J., An Introduction to Xtables-addons , presentation at NFWS 2008, dated Sep. 30, 2008, 43 pages.

Rescorla, E., et al., IETF, Network Working Group, The Transport Layer Security (TLS) Protocol Version 1.3, draft-ietf-tls-tls13-16, Sep. 22, 2016, 104 pages.

Housley, R. et al., IETF, RFC: 2459, Network Working Group, Internet X.509 Public Key Infrastructure Certificate and CRL Profile , The Internet Society, Jan. 1999, 129 pages.

Lowth, C., Kernel Korner—The Hidden Treasures of iptables , Linux Journal, Apr. 1, 2004, available at http://www.linuxjournal.com/article/7180?, 15 pages.

Lowth, C., The Hidden Treasures of iptables , available at http://www.lowth.com/howto/iptables-treasures.php, dated Apr. 2004. , 5 pages.

Nottingham, M. et al., IETF, Network Working Group, HTTP Alternate Services, draft-nottingham-httpbis-alt-svc-03, Feb. 11, 2014, 16 pages.

Nottingham, M. et al., Internet Engineering Task Force (IETF), HTTP Working Group, Opportunistic Security for HTTP, draft-ietf-httpbis-http2-encryption-06, Jun. 21, 2016, 12 pages.

Nottingham, M. et al., RFC: 7838, Internet Engineering Task Force (IETF) HTTP Alternative Services, http://www.rfc-editor.org/info/rfc7838 , Apr. 2016, 20 pages.

Postel, J., RFC: 768, User Datagram Protocol, Aug. 28, 1980, 3 pages.

* cited by examiner

SYSTEMS AND METHODS FOR UTILIZING CLIENT SIDE AUTHENTICATION TO SELECT SERVICES AVAILABLE AT A GIVEN PORT NUMBER

This patent document may contain material which is subject to copyright protection. The copyright owner has no objection to the facsimile reproduction by anyone of the patent document or the patent disclosure, as it appears in Patent and Trademark Office patent files or records, but otherwise reserves all copyright rights whatsoever.

BACKGROUND

Technical Field

This application relates generally to client-server computing, computer networking, and to hosted services.

Brief Description of the Related Art

In the computer networking field, hosted services are usually rendered through a well known port that is registered with the Internet Assigned Numbers Authority (IANA). Procedures for assignment of port numbers are documented in RFC 6335 of the Internet Engineering Task Force (IETF). Well-known port numbers include port 80 for HTTP traffic, port 443 for HTTP over TLS/SSL (sometimes referred to as HTTPS), port 21 for file transfer protocol (FTP) services, port 23 for telnet, and port 53 for domain name services (DNS). In operation, computers typically specify port numbers in the appropriate field of transport layer protocol messages (e.g., UDP or TCP). In the TCP/IP paradigm, the 4-tuple of source and destination IP address and the source and destination port define a socket. The socket effectively represents an endpoint for the connection at the transport layer. A network host's operating system listens on ports for traffic directed to services. Based on the socket the operating system is able to multiplex traffic from clients to the appropriate service running on the host. The service is provided by a particular application running on the host.

This approach is not without downsides. Running on a well-known port number exposes information about the host system being run, namely which services are currently running. Attackers can exploit this information. Also, network policy may prevent some services from being run on a well known port number. Services that do not run on well known ports may be misconfigured, or be another service attempting to circumvent network policy rules.

Typically, ports are used for a single protocol. It is not uncommon, and known in the prior art, to run services over incorrect IANA ports, such as running VPN service on 443 to bypass firewalls. However, a malicious client can determine that the port is providing a VPN service upon connecting to port 443, executing the TLS handshake, and then seeing VPN protocol traffic. The IETF has also promulgated an approach for "alternate services" for HTTP which is said to allow an origin's resources to be authoritatively available at a separate network location, possibly accessed with a different protocol configuration (RFC 7838, April 2016). However, providing such alternate services is in the context of HTTP application layer services, and moreover in the context of a single application; it does not address ports.

Hence, there is a need for improved techniques in this area. The teachings herein address such needs and also provide a variety of benefits and improvements that will become apparent in view of this disclosure. By way of example only, in some embodiments the teachings hereof enable a host to provide one set of (one or more) services to unauthenticated and/or unauthorized clients via a given port, and another set of (one or more) services to authenticated and/or authorized clients over the same port, thereby decreasing the amount of information exposed to unauthenticated and/or unauthorized users, and deliberately misdirecting potential threats. Further details are described below.

SUMMARY

Typically, clients request a particular service from a computer hosting multiple services by specifying a port number associated with the desired service. A computer hosting such services is referred to as a server, or as a server machine. Note that in the field software applications are also sometimes referred to as a web "server" or proxy "server". The fact that they are software applications is generally apparent from context, to those skilled in the art. In general, the term web server "application" or proxy server "application" has been used herein to distinguish from the host they may be running on.

According to some embodiments, the functionality of a host computer is enhanced by having the host computer condition client access to services at a given port number, based on whether the client can be authenticated. Thus, a host computer can change and/or select the service(s) available at a given port number on a client by client basis, or even user by user basis, enabling access to service(s) for trusted clients that are unavailable to untrusted clients. Indeed, the unavailable services preferably remain unadvertised and unseen to untrusted clients. Preferably, client trust is based on whether the client provides a valid certificate in a valid, signed transport layer security (TLS) handshake. It can also be based on similar authentication mechanism in other protocol contexts. In a preferred embodiment, the services made available by the host can be conditioned further based on authorization, e.g., performed in addition to the authentication mentioned above.

The systems and methods disclosed herein have many uses in bundling services on network ports, thereby increasing host computer efficiency, improving network communications, and protecting access to services from untrusted and/or malicious clients.

In one embodiment, this document describes a method performed by a host computer. The host computer has a microprocessor and memory storing computer instructions for execution by the at least one microprocessor to provide a plurality of services to clients. The plurality of services include a first service provided by a first application (e.g., an HTTPS-compliant web server application) and a second service provided by a second application (e.g., a VPN service). Also provided is an operating system that manages network communication traffic between clients and the plurality of services, the network communication traffic comprising transport layer protocol messages. The host may be operating in many contexts. For example, the host may run a proxy web server application, and may be a content server in a content delivery network (CDN).

In this embodiment, the method can include the host computer receiving one or more transport layer messages from a client specifying a particular destination port number. In response, the host computer can execute a transport layer security (TLS) protocol handshake with the client, the TLS handshake including the host computer sending a certificate request to the client, so as to authenticate the client. Based at least in part upon a determination by the host computer that the client responded to the certificate request by any of failing to provide a certificate and providing an empty certificate, the host computer thereafter responds to any client requests for the first service by providing the first service, wherein providing the first service comprises sending the client one or more application layer messages from the first application within one or more transport layer messages with a source port number that is the same as the particular destination port number. And, the host computer responds to any client requests for the second service with any of an error message and no response.

Based at least in part upon a determination by the host computer that the client responded to the certificate request with a valid certificate, and upon completion of said TLS handshake as a valid, signed TLS handshake (note that this does not exclude other checks from occurring too and being part of the basis, such as checking authorization of the client, and/or checking signing authority trust, etc.): the host computer responds to any client requests for the second service by providing the second service, wherein providing the second service comprises sending the client one or more application layer messages from the second application within one or more transport layer messages with a source port number that is the same as the particular destination port number.

Client requests for the first service can include one or more application layer messages within one or more transport layer messages that specify the particular destination port, and client requests for the second service comprise one or more application layer messages within one or more transport layer messages that specify the particular destination port.

As mentioned, the decision to give the client access to the restricted access service can also be based at least in part upon a determination by the host computer to trust a signing authority for the certificate, in addition to the determination that the client responded to the certificate request with a valid certificate, and/or on authorization of the client by the host computer, in addition to the determination that the client responded to the certificate request with a valid certificate.

In many implementations, the particular destination port number that the client is using is a well-known port for the first service, or a registered port for the first service.

In another embodiment described herein, a method is performed by such a host computer involves receiving first one or more transport layer messages from a first client specifying a particular destination port number, and in response to the first one or more transport layer messages, executing a first transport layer security (TLS) protocol handshake with the first client. The first TLS handshake involves the host computer sending a first certificate request the first client, so as to authenticate the first client. The method further includes receiving an empty certificate from the first client, and based at least in part on the receipt of the empty certificate, the host computer responds to any first client requests for the first service by providing the first service, wherein providing the first service comprises sending the first client one or more application layer messages from the first application within one or more transport layer messages with a source port number that is the same as the particular destination port number, and the host computer responds to any first client requests for the second service with any of an error message and no response.

The method can further include the host computer receiving second one or more transport layer messages from a second client specifying the same particular destination port number. In response to the second one or more transport layer messages, the host computer can execute a second transport layer security (TLS) protocol handshake with the second client. The second TLS handshake involves the host computer sending a second certificate request the second client, so as to authenticate the second client. Based at least in part on the second client responding to the second certificate request with a certificate with non-zero content length (that is, it's not an empty certificate), and upon completion of the second TLS handshake as a valid, signed TLS handshake, the host computer responds to any second client requests for the second service by providing the second service, wherein providing the second service comprises sending the second client one or more application layer messages from the second application within one or more transport layer messages with a source port number that is the same as the particular destination port number.

Client requests for the first service can include one or more application layer messages within one or more transport layer messages that specify the particular destination port, and client requests for the second service comprise one or more application layer messages within one or more transport layer messages that specify the particular destination port.

Note that the decision to treat the client as trusted, and provide the second service, can in addition be based in part on a determination by the host computer that the certificate is valid, and/or based at least in part upon authorization of the client by the host computer, in addition to the determination that the client responded to the certificate request with a certificate.

In many implementations, the particular destination port number that the client is using is a well-known port for the first service, or a registered port for the first service.

The teachings hereof may be realized in a variety of systems, methods, apparatus, and non-transitory computer-readable media.

As those skilled in the art will recognize, the foregoing summary merely refers to examples of the invention for illustrative purposes. Such examples are not intended to be limiting. The claims define the scope of the invention.

BRIEF DESCRIPTION OF THE DRAWINGS

The invention will be more fully understood from the following detailed description taken in conjunction with the accompanying drawings, in which.

DETAILED DESCRIPTION

Figure 1:
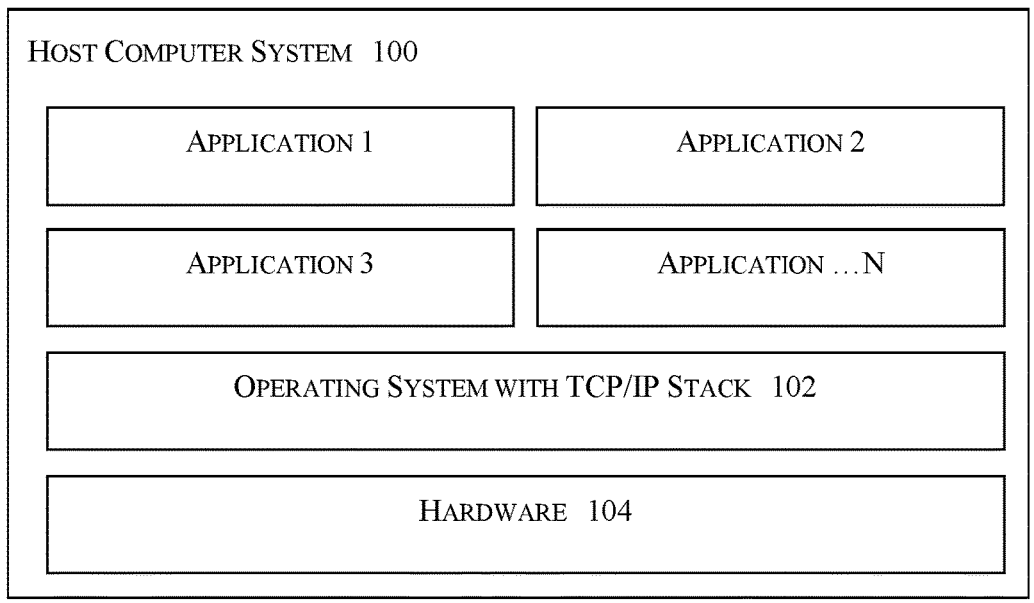
FIG. 1 is a block diagram illustrating software running on a host computer system in accordance with an embodiment of the teachings hereof.

The following description sets forth embodiments of the invention to provide an overall understanding of the principles of the structure, function, manufacture, and use of the methods and apparatus disclosed herein. The systems, methods and apparatus described herein and illustrated in the accompanying drawings are non-limiting examples; the claims alone define the scope of protection that is sought. The features described or illustrated in connection with one exemplary embodiment may be combined with the features of other embodiments, in the manner that those skilled in the art would recognize. Such modifications and variations are intended to be included within the scope of the present invention. It should also be noted that the allocation of functions to particular machines is not limiting, as the functions recited herein may be combined or split amongst different machines in a variety of ways.

All patents, patent application publications, other publications, and references mentioned anywhere in this document are expressly incorporated herein by reference in their entirety, and for all purposes. The term "e.g." used herein is used as an abbreviation for the non-limiting phrase "for example."

Introduction

Typically, clients requests a service from a host computer that offers multiple services, also referred to as a server or server machine. The client can specify the particular service desired by specifying a destination port number that is associated with the desired service. The destination port number is typically specified in the transport layer messages. Both the TCP and UDP protocols define fields for source port (e.g. of the requesting client process) and destination port (in this context, of the host server). See the IETF's RFC 793 and RFC 768, respectively. As known in the art, a service provided by an application is typically provided by application layer messages encapsulated in transport layer messages. If SSL/TLS is used, then the message is encrypted, but as used herein, this still means that the application layer message is encapsulated within the transport layer message. It is just in encrypted form.

Described below are embodiments in which a host computer can be provisioned to control the service(s) that a client is allowed to access at a given port number. Trusted clients are allowed to access services at a port number that are not available to untrusted clients at that same port number. Preferably, although without limitation, untrusted clients are not made aware of the alternate service(s) that are available to trusted clients. For example, the port may be associated with generally available, unrestricted services, and all clients can access such services. However, only trusted clients are able to access an alternate service(s) at that port, e.g., sending requests for the alternate service and actually receiving responsive messages for the service. The untrusted client would receive errors, nothing, or other failure-mode responses. The untrusted client might receive an error response from the unrestricted service, in effect pretending that the restricted service is not available at that port.

Preferably, the restricted-access service is not generally advertised with or associated with the port number. Indeed the port number may be well-known or registered for the service that is unrestricted, and not the restricted-access service. The port number might also be unassigned.

One example of the above, not limiting to this disclosure, is to provide VPN services to trusted clients under the port number commonly used for HTTP over TLS/SSL (443).

Preferably, the host establishes trust in a client by successfully authenticating the client, for example by requiring the client to provide a valid certificate in a transport layer security (TLS) handshake, and otherwise properly completing a valid, signed TLS handshake with the client. Clients that provide no response to a certificate request, empty or invalid certificates, or other insufficient responses in the TLS handshake, are treated as untrusted. Preferably, as long as the client cannot authenticate itself to the server, then it is unstrusted and cannot access the restricted-access services, no matter how long it tries. In certain implementations, the client could be blocked (e.g., by IP address) for at least a period of time (e.g., 5 seconds, 5 minutes, or even 1 day, or otherwise) following the failure to authenticate successfully, possibly the remainder of that connection or a longer other time period.

Note that in some implementations, authentication is necessary for access to the restricted-access service, but not sufficient. For simplicity of explanation in the paragraph above, it has been assumed that all authenticated clients are authorized for the restricted-access services. In many cases, however, clients must be both authenticated and authorized to be granted access to the restricted-access service. Thus, once a client is authenticated, the particular client might need to be authorized for the particular service utilizing an access control list or similar mechanism. Or, if there are multiple restricted-access services, a given trusted client may be authorized to access some but not all such services.

The subject matter described herein has a wide variety of applications in network computing, content delivery (particularly via HTTP/S services), and online platforms. The systems and methods disclosed herein have a variety of uses in bundling services on ports, thereby increasing host computer efficiency in use of network ports. Additionally the system and methods disclosed herein have use in protecting access to services from untrusted and/or malicious clients, in preventing port detection of the actual set of services provided by the host, in creating honeypot machines for malicious IP addresses (e.g., the unrestricted service can function as a honeypot, gathering data and/or otherwise tying up the untrusted client), in protecting resources for legitimate service requests, in bundling enterprise services (e.g., IMAP/VPN/XMPP/Chat) to a single port or smaller set of ports than would otherwise be used, and in reducing the resources a network host uses to handle unauthenticated and/or unauthorized clients.

EXAMPLE A

FIG. 1 schematically and at a high level illustrates software running in a host computer. The details of host computer hardware 104 and general software implementation principles are described with respect to FIG. 8 and in the section below titled "Computer Based Implementation", and the reader is directed to that Figure and section for reference.

FIG. 1 shows exemplary host computer 100 with an operating system 102, such as Linux, Unix, Windows, or the like, and several applications 1 . . . N, which may be user-space applications or daemons (all referred to as applications herein). While not all applications provide network services, assume in this case that applications 1, 2, 3 . . . N are ones that provide services to requesting clients over a network.

Clients connect to the host computer 100 via the network interface to request services from one of the applications. Exemplary clients include client software running on devices such as personal computers, laptops, smartphones, and embedded devices that seek services via one or more computer networks from the host 100, typically running a web browser or an app that uses HTTP and HTML, XML, JSON or other application layer protocol and data format to communicate with the host. The teachings hereof are not limited to any particular form of client, application layer protocol, or data format.

Typically, the operating system 102 kernel provides certain network communication functions for the applications. Generally this is done in the TCP/IP stack, which receives receiving IP/TCP packets over a network interface, and implements IP and TCP algorithms to unpack the incoming packets and, when needed, to send outgoing messages in accordance with the TCP/IP protocols, which are known in the art. The operating system 102 delivers application layer data received from a client to a socket for the appropriate application. A socket is typically defined by the 4-tuple of source and destination IP address and source and destination port. As mentioned, the operating system 102 also handles outgoing traffic. In this role, the operating system 102 sends application layer messages from an application to the client in the appropriate IP/TCP packets.

There are many known examples of applications that provide services to clients. Some examples are: web server software, which use HTTP (and when utilizing TLS/SSL, sometimes this is referred to as HTTPS), web proxy server software, virtual private network (VPN) server software, media server software, mail server software (SMTP), name server software (DNS servers), database server software (e.g., SQL server), LDAP, Kerberos, Tor (onion routing), XMPP (jabber), POP and IMAP services, IRC, RDP (Remote Desktop Protocol), and indeed any application that can layer over TLS. The teachings hereof are not limited to any particular service or application providing such service.

As mentioned earlier, ports are typically reserved for a single use and purpose. In accordance with an embodiment of the teachings of this document, however, the host 100 can allow a client to access alternative services on the same port number based upon the result of a TLS handshake.

Figure 2:
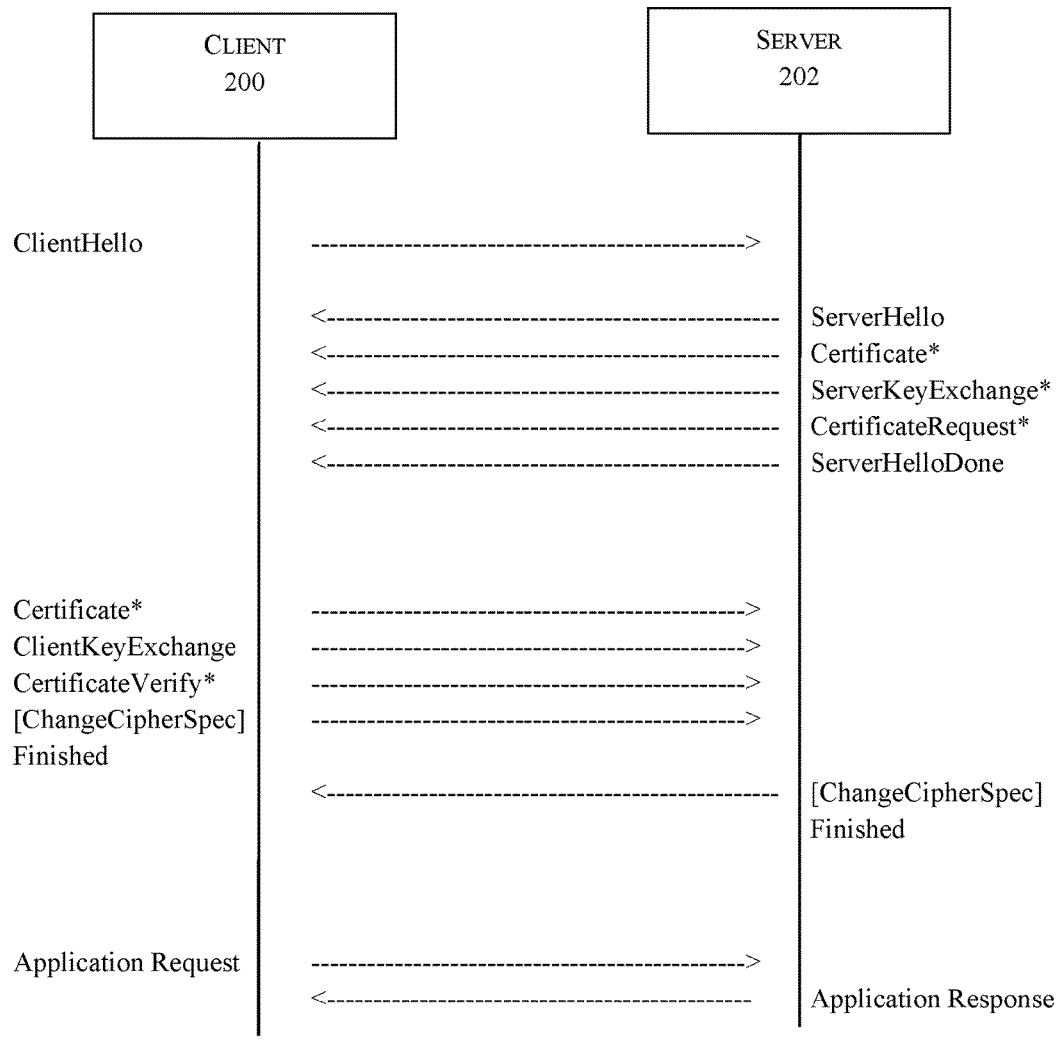
FIG. 2 is an illustration of a standard TLS handshake sequence, as known in the art.

A standard TLS handshake is illustrated in FIG. 2, which depicts the message flow between client 200 and server 202 as specified in IETF RFC 5246 (see Section 7.3 among others), the teachings of which are available to those skilled in the art and incorporated by reference. (Note again that the term "server" in the TLS handshake in this context means the "host computer" with the software that provides multiple services to clients, as described above, and not solely a particular server application running on the host.)

As known in the art, a TLS handshake is generally performed on top of the TLS record layer and at the beginning of a transport layer connection (e.g. TCP connection). TLS facilitates a reliable and private encrypted channel between the client 200 and the server 202. TLS also accommodates mechanisms to establish client and server trust in the form of certificate requests.

With reference to FIG. 2 and RFC 5246, Section 7.3, the TLS handshake protocol generally involves the following, in which some details are omitted for clarity of explanation. An end-user client 200 initiates the handshake with a ClientHello message. The server 202 responds with a ServerHello message. These messages establish the protocol version, session ID, cipher suite, and compression method to be used. A key exchange takes place and these keys are used to encrypt the data that is exchanged; the reader is directed to RFC 5246 for details, which are known in the art.

In the Certificate message, a server 202 may provide its certificate (e.g., x.509 certificate) for server authentication purposes, and a ServerKeyExchange message in some instances when there is no certificate or when the certificate does not have sufficient data for certain key-generation purposes. Then, according to RFC 5246, the server 202 may also request a certificate from the client; this is the CertificateRequest message. The RFC states that the structure of the Certificate message is:

enum {
rsa_sign(1), dss_sign(2), rsa_fixed_dh(3), dss_fixed_dh(4),
rsa_ephemeral_dh_RESERVED(5), dss_ephemeral_dh_RESERVED(6),
fortezza_dms_RESERVED(20), (255)
}ClientCertificateType;
opaque DistinguishedName<1 . . . 2^16-1>;
struct}
ClientCertificateType certificate types<1 . . . 2^8-1>;
SignatureAndHashAlgorithm
supported_signature_algorithms<2^16-1>;
DistinguishedName certificate_authorities<0 . . . 2"16-1>;
} CertificateRequest;
certificate_types
A list of the types of certificate types that the client may offer.
rsa_sign a certificate containing an RSA key
dss_sign a certificate containing a DSA key
rsa_fixed_dh a certificate containing a static DH key.
dss_fixed_dh a certificate containing a static DH key
supported_signature_algorithms
A list of the hash/signature algorithm pairs that the server is able to verify, listed in descending order of preference.
certificate_authorities
A list of the distinguished names [X501] of acceptable certificate_authorities, represented in DER-encoded format. These distinguished names may specify a desired distinguished name for a root CA or for a subordinate CA; thus, this message can be used to describe known roots as well as a desired authorization space. If the certificate authorities list is empty, then the client MAY send any certificate of the appropriate ClientCertificateType, unless there is some external arrangement to the contrary.

Note that RFC 5246 states that the server 202 can request that the client 200 send a certificate only when the server 202 is authenticated and when appropriate to the cipher suite, however the teachings hereof are not limited in such a way.

At this point, the server 202 sends a ServerHelloDone message and waits for the client to respond.

If the server 202 sends a CertificateRequest message, the client 200 must respond with a Certificate message, as is described in Section 7.4.6 of the RFC. If no suitable certificate is available, then according to the specification, the client 200 must send a certificate message containing no certificates, that is, the certificate list structure would have zero length. This is an empty certificate. If the client 200 does not provide a certificate or the certificate cannot be validated or is otherwise unacceptable (e.g., not signed, untrusted certificate authority in chain), then per the RFC, the server 202 has discretion with regard to whether to continue to communicate with the unauthenticated client 200.

The Certificate message is defined in the specification as follows:

opaque ASN.1Cert<1 . . . 2^24-1>;
struct {
ASN.1Cert certificate list<0 . . . 2^24-1>;
} Certificate;
certificate_list
    This is a sequence (chain) of certificates. The sender's certificate MUST come first in the list. Each following certificate MUST directly certify the one preceding it. Because certificate validation requires that root keys be distributed independently, the self-signed certificate that specifies the root certificate authority MAY be omitted from the chain, under the assumption that the remote end must already possess it in order to validate it in any case.

As shown in FIG. 2, after the Certificate, the client 200 sends ClientKeyExchange message, the content of which depends on the public key algorithm designated earlier in the Hello messages. Finally, as stated in RFC 5246, if the client 200 sent a certificate with signing ability, the client 200 sends a digitally-signed CertificateVerify (signed as specified in RFC 5246 section 7.4.8 with the client's private key that corresponds to the public key in the client's certificate) message to verify possession of the private key in the certificate, and then a ChangeCipherSpec message, and directly thereafter sends a Finished message (generated as specified in RFC 5246 section 7.4.9, with the just negotiated algorithms, keys, and secrets, see RFC for details, and also signed). The ChangeCipherSpec messages serves to notify the receiving side that further messages will be encrypted according to the newly agreed upon cipher from the handshake. The server 202 responds with a ChangeCipherSpec message, and sends its Finished message using the new cipher (again as specified in RFC 5246 section 7.4.9 for the server).

FIG. 2 also shows that, following the TLS handshake, application layer data is passed for Application 1, such as an HTTP application, over the encrypted connection.

Figure 3:
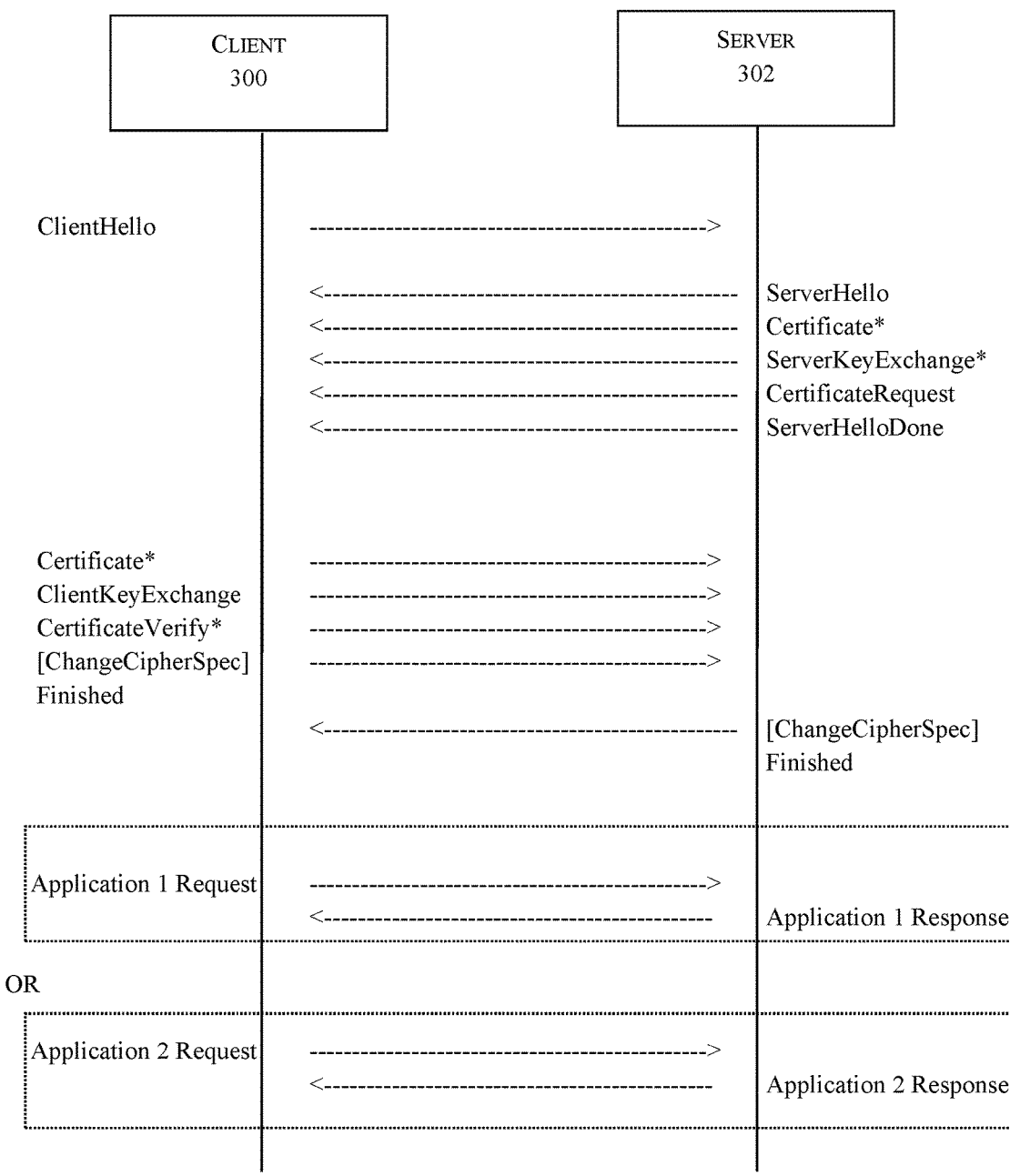
FIG. 3 is an illustration of an exemplary TLS handshake sequence in accordance with an embodiment of the teachings hereof.

FIG. 3 is a diagram of a modified TLS handshake in accordance with the teachings hereof. The sequence of messages largely tracks that of FIG. 2, except that FIG. 3 adds the ability to change the Application Data that is transferred at the end of the TLS negotiation, depending on the results of the negotiation. In this embodiment, if the server 302 does not trust the client's certificate, or the client 300 provides an empty client certificate in response to the server's Certificate message, as mandated by RFCS 5246 (Section 7.4.6), then Application 1 Traffic will be passed. However, if the server 302 trusts the client certificate, and a valid, signed TLS handshake is completed, the server 302 will allow the client to communicate sending and receiving with Application 2 Data. Application 2 Data might provide a VPN service. Note that server 302 can response to any Application 1 Data communication from the client 300 in a variety of ways: it might ignore, send an error, or, in other embodiments, provide the Application 1 service to client 300 if the client 300 requests it. Of course, the teachings hereof are not limited to two applications; any number (N) of applications might be available to trusted clients that are unavailable to untrusted clients. The certificates installed on the client can be used to determine the applications it can receive. For example, if a client authenticates with a certificate for VPN services, then the server can provide VPN services only; a client authenticating with a certificate for SMTP services can receive those services. Generalizing, if server can authenticate the client (and authorize as required), the client will be able to send and receive data from a different application data on the server than the untrusted client.

EXAMPLE B

Figure 4:
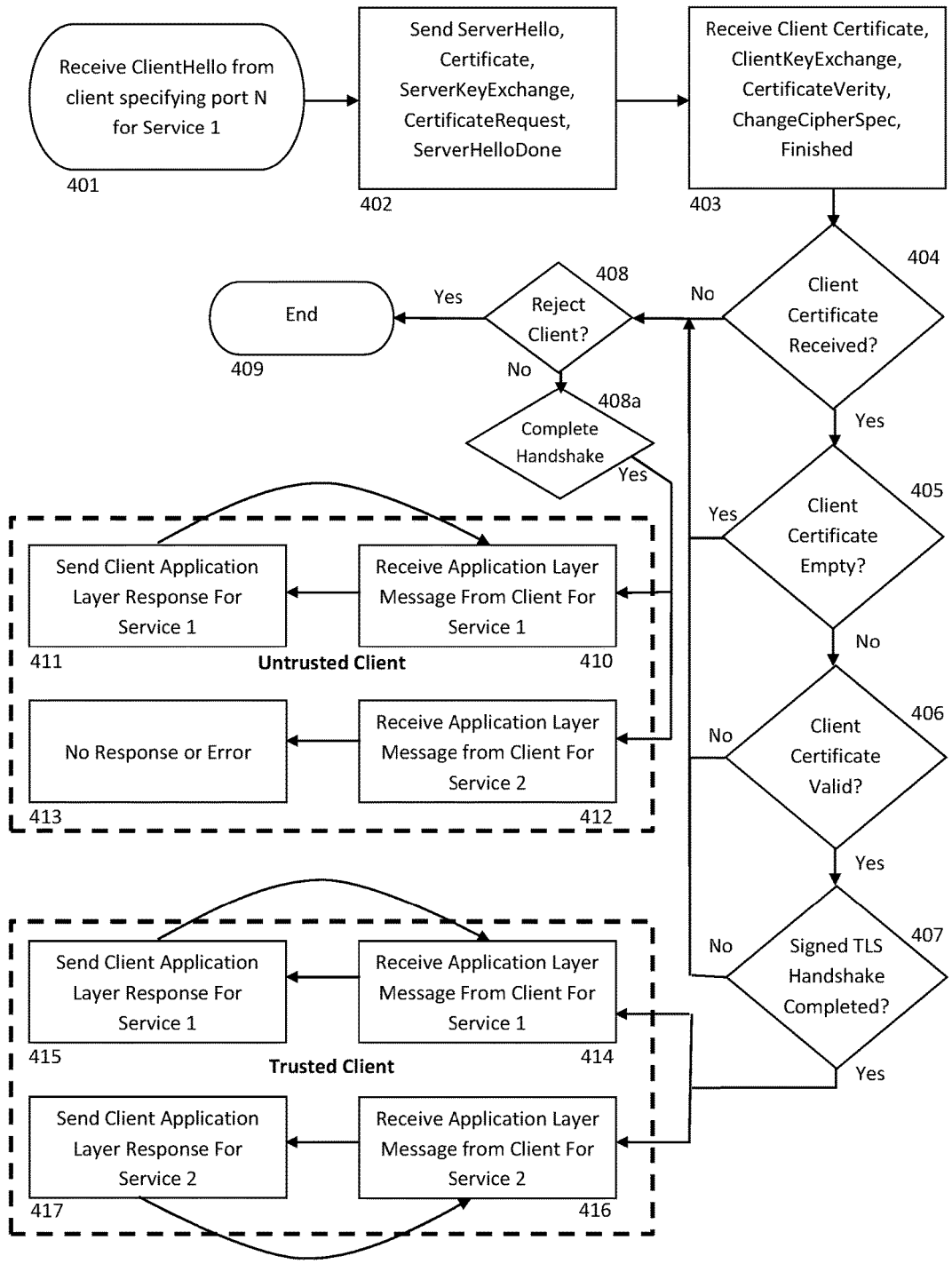
FIG. 4 is a logical flow diagram illustrating steps executed by a program executing on a host computer to determine whether to allow a client to access a service, referred to as Service 2, in accordance with an embodiment of the teachings hereof.

FIG. 4 is a flow diagram illustrating logic executed within a host computer 100 providing Services 1 and 2 to clients, in accordance with an embodiment of the teachings hereof. In overview, FIG. 4 illustrates the logic by which the host attempts to determine whether a client should be given access to Service 2, which is provided by Application 2 running on the host. The host attempts to authenticate a requesting client in the TLS handshake. The trusted client receives responses to its application layer requests for Service 2. The untrusted client receives no responses or errors to its application layer requests for Service 2, but it can receive Service 1, which is provided by Application 1 running on the host.

Turning now to a detailed description, and beginning with step 401, the host receives a ClientHello specifying a port that is associated with Service 1. The host sends TLS-standard messages as shown in step 402. Per step 403, the host should receive a client certificate in response to the CertificateRequest message, and other messages, to complete the client side of the handshake.

In step 404, the host 100 checks to see if a client certificate was in fact received. If not, control moves to 408, in which the host can device whether to reject the client altogether, thus in effect not even providing the client with Service 1. This result is shown at 409 in which the communication is ended and the connection closed. In a TCP implementation, the host can close the TCP connection at this point. Per the specification, the host 100 would send a TLS alert message (sec. 7.2.2. of RFC 5246, error messages) and indicate a fatal error before closing, although the host 100 could simply close the connection without communicating why. The host 100 also could send a non-fatal error message in order to retry aspects of the handshake, for example in accord with the discretion afforded a host in Section 7.2.2.

Alternatively, however, the host 100 can determine not to reject the client and complete the handshake (408*a*) and then send and receive application layer traffic for Service 1 with this untrusted, anonymous client, as indicated by 410/411. (As those skilled in the art would understand, if the remainder of the handshake fails at 408*a*, control moves back to 408, but this arrow is not shown for clarity of illustration.) If the client attempts to request Service 2, then any of a variety of approaches can be used: e.g., no response can be given, or an error message can be sent, preferably using an error message in accord with the protocol of Service 1.

If a client certificate has been received, control moves to 405, at which point the host 100 determines whether the certificate is empty. If the certificate is empty, which is the standard-defined response for clients that do not have a certificate—then control moves to 408 and proceeds as already explained above. If the certificate is not empty, control moves to 406, at which point the host determines whether the certificate is valid. Validation of certificates vary depending on the certificates being used, but well-known public-key-infrastructure trust chains and certificate signing and validation techniques can be used. For example, a trusted first or third party (e.g., certificate authority) issues a certificate to the client entity, which then proffers them to the server as described herein. Known certificate providers include Symantec (formerly Verisign) and Comodo. Validation involves decrypting the signature of the certificate with the issuer's public key and verifying that the certificate's hash matches the decrypted hash, and thus that the certificate is authentic (and accordingly, a public key in the certificate that is associated with the client). Details regarding trust chains are known in the art, as evidence by IETF RFC 5280 (see Section 3.2) and RFC 2459 (see Section 3.2), the content of which are incorporated by reference and available to those skilled in the art.

If the certificate is not valid, control moves to 408 and proceeds as already explained above.

Note that as part of the certificate validation process in 406, the host 100 determines whether it trusts the signing authority for the certificate. Some certificates are self-signed, others are signed by one or various certificate authorities. If not trusted, then in effect the certificate cannot be validated, and control would move to 408 and proceeds as already explained above.

If the client's certificate is validated in step 406, control moves to step 407. In this step, the host 100 checks for a complete a valid, signed TLS handshake with the client. This involves two concepts. First, a valid TLS handshake must be completed. The details of an exemplary valid TLS handshake process and what is necessary for the handshake to be successful were described above with respect to FIGS. 2/3 and RFC 5246. If the handshake fails for any reason, then control would move to 408. While the host 100 can respond however it wants, in this circumstance the host 100 typically and per the RFC would send a TLS Alert message to notify the other side of the handshake failure (a fatal error in section 7.2.2 of RFC 5246) before closing the connection. In an alternate embodiment, the host 100 could simply end the connection with no communication. Second, the TLS handshake must be signed so as to prove that the client is the owner of the certificate it sent. In other words, in addition to the host 100 validating the client certificate, the host 100 also must be able to determine that the certificate sent from the client in fact belongs to the client, thus binding the certificate and client, and authenticating the client. In the TLS protocol described in RFC 5246, this generally involves verifying signed messages from the client. Two signed messages can be sent by the client—the CertificateVerify message (if sent) and the client's Finished message. (See RFC 5246, sections 7.4.8 and 7.4.9.)

More specifically, if a client sends a CertificateVerify message, which is often the case, the client hashes and signs the prior handshake messages up to that point in the given handshake (note that the specifics of which messages are considered handshake messages is explained in sec. 7.4.8). When signing, client uses the private key that corresponds to the public key in its certificate. The host 100, receiving this message, is able to verify the signature by calculating its own server hash of prior handshake messages, decrypting the message from the client to obtain the client's hash with the client's public key, and comparing the two hashes. If they match, the host 100 can be confident that the client in fact has the private key corresponding to the public key in the certificate, and therefore that the client is indeed the entity identified in the certificate (as long as the private key has been kept secret by the client). Similarly, the client hashes and signs prior handshake messages and sends the result in the client's Finished message. This is a second signature that the host 100 can verify in the same manner as before. It should be understood that the foregoing is merely an example of typical TLS operation per RFC 5246 (which is TLS 1.2). The techniques disclosed in this document are not limited to the above-described approach or the particular set of steps. Further evolutions of TLS and indeed other protocols, including future protocols, may be used in conjunction with the techniques described in this document to authenticate a client.

If steps 406 and 407 are passed successfully, the client is authenticated and the host 100 is ready to send and receive application layer traffic for Service 2 with this client. This this shown by 414/415 for Service 1, and by 416/417 for Service 2. Regardless of which service, the traffic is passed using the port that is nominally associated with Service 1, as was specified at 401 by the client. The host operating system can direct traffic to the correct application for Service 1 or 2 in a variety of ways. For example, the host will already know the IP address and port, and potentially a session identifier that it is using to communicate with the client. Thus, a lookup table can be used to direct traffic arriving over the connection to the proper service (i.e., Service 1 or 2). In effect, such a lookup table could provide a mapping such as (Session ID)→(application N), or (IP address, port) →(application N), or (IP address, port, session id)→(application N).

It may be possible, with further development and in a future implementation, to incorporate the above approach into the well-known use of sockets in an operating system, i.e., by adding a field such as the Session ID (or an auth/no auth flag or code) to the socket identifier, making it a 5-tuple instead of the traditional 4-tuple. Such an implementation has not been fully designed currently, beyond what is taught herein, but rather is envisioned as one possible avenue for the future.

Also, it may be possible, with further development and in a future implementation, to configure the host to transfer an authenticated client to a restricted-access application that is actually executing on another machine. Such an implementation has not been fully designed currently, beyond what is taught herein, but rather is envisioned as one possible avenue for the future.

While FIG. 4 illustrates both restricted-access Service 2 and public Service 1 being available an authenticated client, note that in a preferred embodiment, the host 100 provides only Service 2 to authenticated clients, and not Service 1. In this case, the host can send a Service 2 error message to the client if the client tries to use Service 1 at step 415. This alternate embodiment might be particularly useful in the case where Service 1 represents a honeypot and/or data-gathering service (for example, an HTTPS service but to a fake website). This approach also reduces the complexity described in the preceding paragraph.

Regarding the above-described logical flow, note that certain messages sent from the host 100 to complete the TLS handshake that were depicted in FIGS. 2-3, such as the change of cipher and the Finished message, are not explicitly shown in FIG. 4. This is for clarity of illustration and in order to focus on the authentication aspects. However, one can assume that the host sends the needed messages to complete the TLS handshake after step 403 and as part of attempting to reach step 407. One exception to this could be if step 404 fails due to the lack of any certificate at all, in which case the host might be configured to not even complete the pending handshake and simply terminate the connection.

EXAMPLE C

Figure 5:
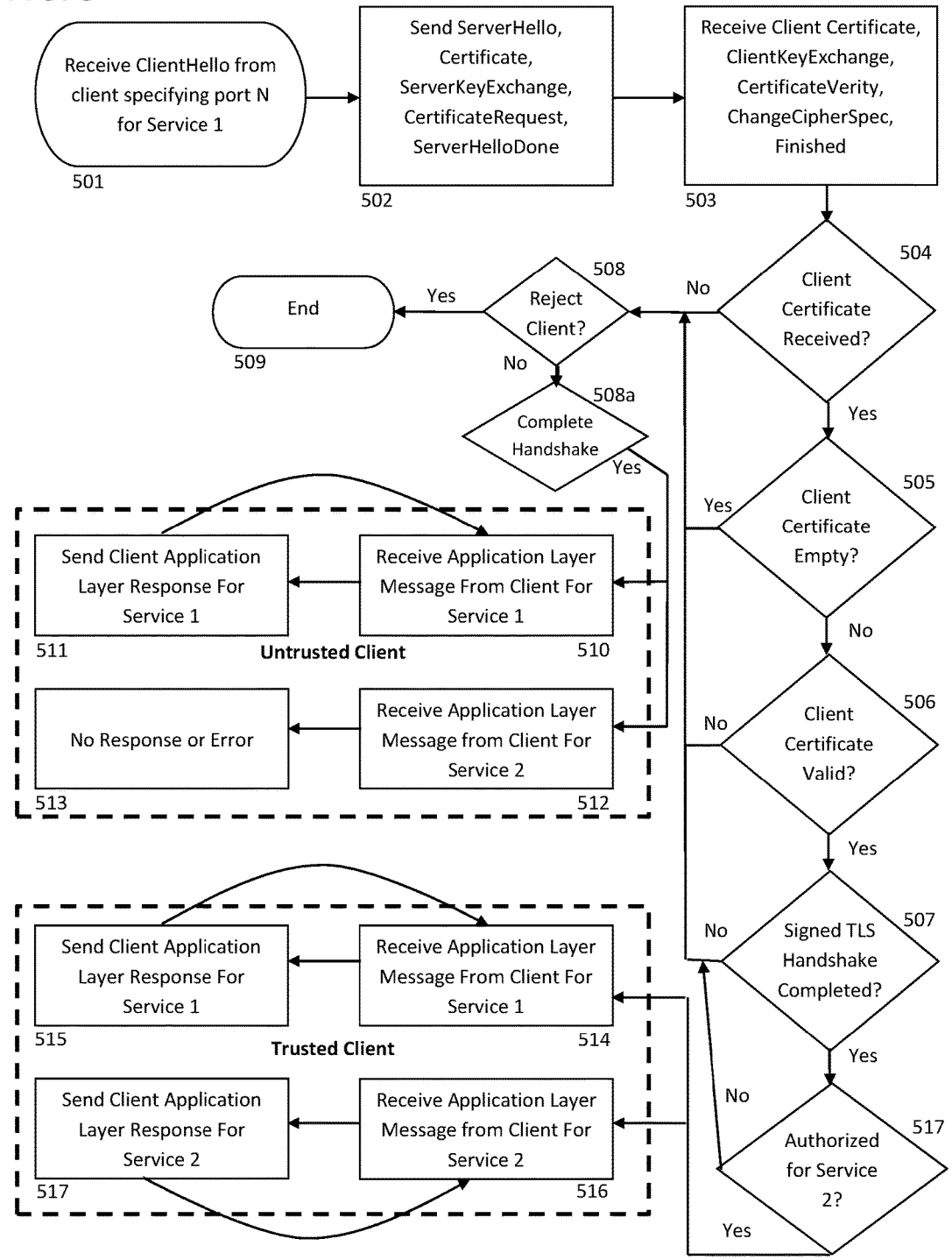
FIG. 5 is an alternative logical flow diagram illustrating steps executed by a program executing on a host computer to determine whether to allow a client to access a service, referred to as Service 2, in accordance with an embodiment of the teachings hereof.

FIG. 5 is a flow diagram illustrating logic executed within a host computer 100, in accordance with another embodiment of the teachings hereof. FIG. 5 largely parallels FIG. 4, with corresponding reference numbers illustrating corresponding functionality by the last two digits (such as 401 corresponding to 501, 402 corresponding to 502, and so on).

However, FIG. 5 differs from FIG. 4 in that it adds a step in the chain of checks that the host 100 performs with regards to the client. In particular, step 517 is added following a positive outcome at step 507. At this point, the host has determined that there is a non-empty client certificate, it is valid, and that the host trusts the signing authority, and the host has completed a valid, signed TLS handshake with the client. At 517, now that the host checks authorization.

An authorization check can be done on the basis of information/identifiers embedded in the certificate for the client device or the user thereof. This information is checked against an access control list available to the host computer 100. A given client device (or user) may be authorized for some services, but not others. It will be apparent to those skilled in the art that under the teachings of this document, multiple different restricted-access services might in fact be reachable on the port advertised for Service 1. The host computer can determine which one or one(s) of such restricted-access Services the client is authorized to use at step 517, and provide access only to those Services. In this way, Service 2 in FIG. 5 can be understood to represent any Service(s) that the client is authorized for.

In another embodiment, the host 100 determines which restricted-access Service the client can use based on the certificate installed on the client and provided by the client in the handshake. In other words, a client certificate is specific to a given service. In this embodiment, for example, if a client authenticates with a certificate for VPN services, then the server can provide VPN services only; a client authenticating with a certificate for SMTP services can receive those services. This embodiment proceeds as shown in FIG. 5, except that the authorization step is augmented and/or replaced with a "Check Certificate to Determine Service" step.

EXAMPLE D

A typical host running a VPN service will make it available on TCP port 1194. A malicious client may scan for open ports on that system and determine that a VPN service is running. To combat this, it is known in the art for an administrator might change VPN to a nonstandard port, e.g., a non well-known-port where well-known ports are defined by RFC 6335, or an alternate well-known-port, such as 443, to masquerade as HTTPS traffic. However, if a malicious client tries to negotiate on port 443 using TLS, the handshake will succeed. When the malicious client tries to send an HTTPS request the operation will result in an error at the host, or worse the malicious client will be able to determine the true nature of the application reachable at that port number. Note that for most HTTPS client requests, a server does not issue CertificateRequest at all. Client authentication instead occurs at the application layer, for example by username, password, or other mechanism. Another method of client-side authentication, however, is to have the host request a client certificate. The latter approach is the one used here.

Thus, in accordance with an embodiment of the teachings hereof, identified herein as Example D, a host runs both VPN and HTTPS services on a single port. A malicious client will only be served HTTPS traffic, while trusted clients will be able to access VPN traffic. HTTPS and VPN are only two services/application protocols, but this could also be used for any such TLS negotiated connection. Preferably, a client becomes trusted by providing a certificate in the TLS handshake that the host can validate and trusts. The application traffic that is served is based on the TLS handshake, and in particular the client's response to the host's request for the client certificate.

Client Certificates

The certificate provided by a client in accord with an embodiment of the teachings hereof is not limited to a soft certificate. Suitable certificates may be stored in hardware tokens such as smart cards, card with integrated chip, SIM cards, common access cards such as those used for standard identification for United States defense personnel, and the like. Some smart cards contain one or more x.509 certificates and a private key that can be used for client-side authentication. In some embodiments, running two services on different systems can be done using two different certificates, e.g. one for www.example.com and one for vpn.example.com. This approach allows the host to be found at www.example.com only, but be used for both WWW and VPN traffic. The teachings of U.S. Pat. No. 4,105,156 are incorporated by reference.

Other Embodiments

The following are descriptions of alternate embodiments leveraging the teachings hereof. Such implementations have not been fully designed currently, beyond what is taught herein, but rather are envisioned as possible avenues for the future, based on the teachings hereof.

In one alternate embodiment, the host that initiates the TLS handshake can maintain the session with the client, while sending the application data (e.g., the application layer data in application layer messages for the restricted access application) to a separate, remote host that handles the messages. Thus, the initiating host acts as a TLS broker or proxy. Preferably, the separate, remote host can process the application layer messages and then respond to the client directly, preferably as if it were the initiating host (e.g., with the initiating host's IP address as the source IP). This direct response approach is known in the field as "triangular routing" or "direct server return", and is described along with variants thereof in U.S. Pat. Nos. 8,078,755, 8,688,817; 7,698,458; 7,313,631; 7,305,429; 5,774,660; 6,182,139; EP Patent Publication EP1687951, PCT Publication No. WO 2015/100283, US Patent Publication Nos. 2004/0260745; and US Publication No. 2003/0056002, the contents of all of which are hereby incorporated by reference in their entireties.

In another alternate embodiment, the result of the TLS handshake can be sent from the host to a network switch or router with Network Address Translation (NAT), so that such switch or router can route traffic for a specific IP and port (i.e., the trusted client's IP and port) differently than other client's traffic.

Similarly, the TLS handshake can in fact be performed on the network switch or router itself, rather than the host. The switch/router can then route traffic accordingly. Generalizing, although the bulk of the description above has focused on a layer-7 host, the techniques described here can be used just as well on a layer 4 (transport layer) device that is capable of completing a TLS handshake with a given client.

Other Use Cases

The following are other use cases for the TLS-handshake based switching mechanism described herein.

a. Bundling certificates for a single port. Adding more services to a single port would reduce the amount of certificate issuance and complexity. Less certificates would have to be issued for many more services. This enables a single-server-certificate to be used with one hostname but for two services, rather than the server having to maintain two certificates (e.g. one for VPN and one for HTTP services).

b. Preventing port detection by clients of actual services being made available by a host c. Creating a honeypot or tarpit for malicious IP addresses, while protecting legitimate services. Honeypots and tarpits are known generally in the art but their use with the particular TLS-handshake based switching mechanism disclosed herein is not. For example, assume the host computer provides HTTPS and VPN services on a single port, per Example 3. Trusted clients access VPN services. Untrusted clients receive HTTPS services; in addition, the HTTPS server on the host is configured such that it provides or fake responses (e.g., objects for a fake website). This enables the host to tie up the malicious client and/or gather intelligence about it.

d. Bundling all enterprise services to a single port, such as IMAP/VPN/XMPP/Chat. For this, each client can be installed with a certificate for the type of service it is qualified to receive.

e. Reducing the resources (e.g., processing time, memory, bandwidth) required to handle unauthenticated and/or unauthorized clients, as they are shunted to the non-trusted service.

Other Advantages

The potential advantages described should not be construed as being necessarily achieved by, or required for, practice of the invention.

In general, host computers must advertise what services they are running by either opening up a port, or using a nonstandard port, but with the same protocol. The teachings hereof:

a. Prevent malicious attacks from being able to access services for trusted clients b. Prevent intrusion detection systems from being able to determine what services a host is running.

c. Prevents and/or reduces advertising of services on known ports d. Reduces computing time devoted to countermeasures used to thwart attacks on known ports and services.

e. Reduces the size of a server's open port fingerprint. By reducing the open ports, and having only public service ports open, the host is protected against an entity attempting to connect to various ports (e.g., SYN connection and then sending data) to try to determine which services the host makes available. Such 'port scanning' is undesirable.

f. Allow services to run over known non-standard port numbers g. Allow clients to bypass firewall/intrusion detections systems, because a client can pass through the firewall on a port (e.g., 443) that is open through the firewall, even if they need restricted access services.

h. Similar to above, allow clients to masquerade traffic for different services i. Prevent bots from discovering services Use in Content Delivery Networks In some implementations, the teachings hereof can be incorporated into a content server(s) in a content delivery network of CDN. Specifically the network host computer may be a CDN server 602/700 shown in FIGS. 6-7 and described below. A "content delivery network" or "CDN" is an example of a distributed computing system and is generally operated and managed by a service provider, which typically provides the content delivery service on behalf of third parties. A "distributed system" of this type typically refers to a collection of autonomous computers linked by a network or networks, together with the software, systems, protocols and techniques designed to facilitate various services, such as content delivery or the support of outsourced site infrastructure. This infrastructure is shared by multiple tenants, typically content providers. The infrastructure is generally used for the storage, caching, or transmission of content—such as web pages, streaming media and applications—on behalf of such content providers or other tenants. The platform may also provide ancillary technologies used therewith including, without limitation, DNS query handling, provisioning, data monitoring and reporting, content targeting, personalization, and business intelligence. The CDN processes may be located at nodes that are publicly-routable on the Internet, within or adjacent nodes that are located in mobile networks, in or adjacent enterprise-based private networks, or in any combination thereof.

Figure 6:
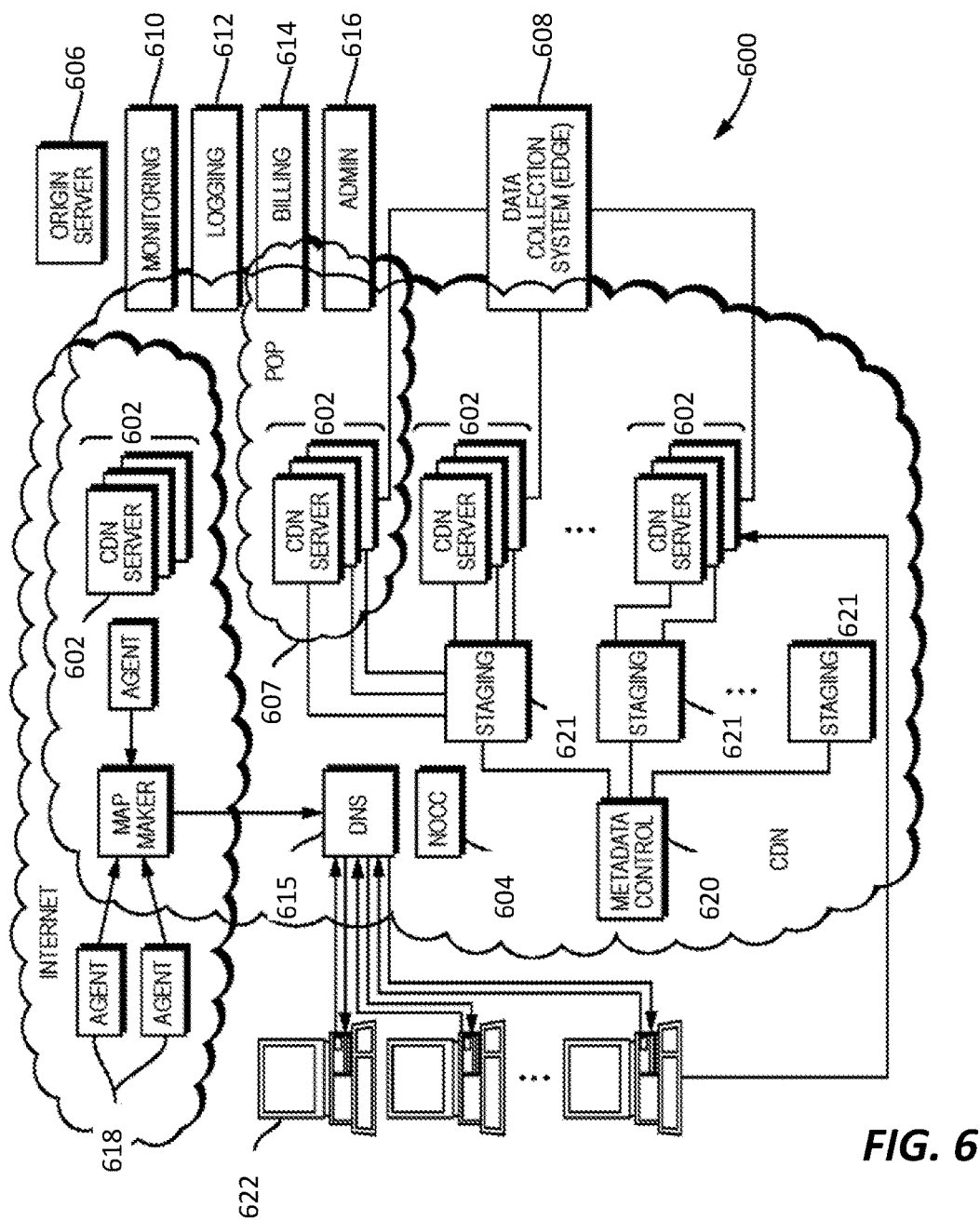
FIG. 6 is a schematic diagram illustrating an embodiment of a distributed computer system configured as a content delivery network (CDN); and, FIG. 7 is a schematic diagram illustrating an embodiment of a machine, with certain software components, on which a CDN server in the system of FIG. 6 can be implemented; and, FIG. 8 is a block diagram illustrating hardware in a computer system that may be used to implement the teachings hereof.

In a known system such as that shown in FIG. 6, a distributed computer system 600 is configured as a content delivery network (CDN) and is assumed to have a set of machines 602 distributed around the Internet. Typically, most of the machines are configured as servers and located near the edge of the Internet, i.e., at or adjacent end user access networks. A network operations command center (NOCC) 604 may be used to administer and manage operations of the various machines in the system. Third party sites affiliated with content providers, such as web site 606, offload delivery of content (e.g., HTML or other markup language files, embedded page objects, streaming media, software downloads, and the like) to the distributed computer system 600 and, in particular, to the servers (which are sometimes referred to as content servers, or sometimes as "edge" servers in light of the possibility that they are near an "edge" of the Internet). Such servers may be grouped together into a point of presence (POP) 607.

Typically, content providers offload their content delivery by aliasing (e.g., by a DNS CNAME) given content provider domains or sub-domains to domains that are managed by the service provider's authoritative domain name service. End user client machines 622 that desire such content may be directed to the distributed computer system to obtain that content more reliably and efficiently. The CDN servers respond to the client requests, for example by obtaining requested content from a local cache, from another CDN server, from the origin server 606, or other source.

Although not shown in detail in FIG. 6, the distributed computer system may also include other infrastructure, such as a distributed data collection system 608 that collects usage and other data from the CDN servers, aggregates that data across a region or set of regions, and passes that data to other back-end systems 610, 612, 614 and 616 to facilitate monitoring, logging, alerts, billing, management and other operational and administrative functions. Distributed network agents 618 monitor the network as well as the server loads and provide network, traffic and load data to a DNS query handling mechanism 615, which is authoritative for content domains being managed by the CDN. A distributed data transport mechanism 620 may be used to distribute control information (e.g., metadata to manage content, to facilitate load balancing, and the like) to the CDN servers.

Figure 7:
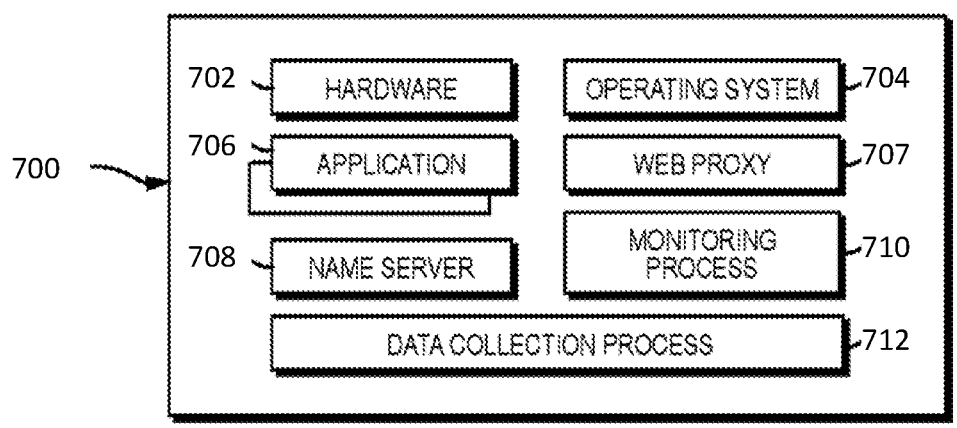

As illustrated in FIG. 7, a given machine 700 in the CDN comprises commodity hardware (e.g., a microprocessor) 702 running an operating system kernel (such as Linux® or variant) 704 that supports one or more applications 706*a-n*.

To facilitate content delivery services, for example, given machines typically run a set of applications, such as an HTTP proxy 707, a name server 708, a local monitoring process 710, a distributed data collection process 712, and the like. The HTTP proxy 707 (sometimes referred to herein as a global host or "ghost") typically includes a manager process for managing a cache and delivery of content from the machine. For streaming media, the machine typically includes one or more media servers, such as a Windows® Media Server (WMS) or Flash server, as required by the supported media formats.

A given CDN server shown in FIG. 7 may be configured to provide one or more extended content delivery features, preferably on a domain-specific, content-provider-specific basis, preferably using configuration files that are distributed to the CDN servers using a configuration system. A given configuration file preferably is XML-based and includes a set of content handling rules and directives that facilitate one or more advanced content handling features. The configuration file may be delivered to the CDN server via the data transport mechanism. U.S. Pat. No. 7,240,100, the contents of which are hereby incorporated by reference, describe a useful infrastructure for delivering and managing CDN server content control information and this and other control information (sometimes referred to as "metadata") can be provisioned by the CDN service provider itself, or (via an extranet or the like) the content provider customer who operates the origin server. U.S. Pat. No. 7,111,057, incorporated herein by reference, describes an architecture for purging content from the CDN.

In a typical operation, a content provider identifies a content provider domain or sub-domain that it desires to have served by the CDN. The CDN service provider associates (e.g., via a canonical name, or CNAME, or other aliasing technique) the content provider domain with a CDN hostname, and the CDN provider then provides that CDN hostname to the content provider. When a DNS query to the content provider domain or sub-domain is received at the content provider's domain name servers, those servers respond by returning the CDN hostname. That network hostname points to the CDN, and that hostname is then resolved through the CDN name service. To that end, the CDN name service returns one or more IP addresses. The requesting client application (e.g., browser) then makes a content request (e.g., via HTTP or HTTPS) to a CDN server associated with the IP address. The request includes a host header that includes the original content provider domain or sub-domain. Upon receipt of the request with the host header, the CDN server checks its configuration file to determine whether the content domain or sub-domain requested is actually being handled by the CDN. If so, the CDN server applies its content handling rules and directives for that domain or sub-domain as specified in the configuration. These content handling rules and directives may be located within an XML-based "metadata" configuration file, as described previously.

As an overlay, the CDN resources may be used to facilitate wide area network (WAN) acceleration services between enterprise data centers (which may be privately managed) and to/from third party software-as-a-service (SaaS) providers.

CDN customers may subscribe to a "behind the firewall" managed service product to accelerate Intranet web applications that are hosted behind the customer's enterprise firewall, as well as to accelerate web applications that bridge between their users behind the firewall to an application hosted in the internet cloud (e.g., from a SaaS provider). To accomplish these two use cases, CDN software may execute on machines (potentially in virtual machines running on customer hardware) hosted in one or more customer data centers, and on machines hosted in remote "branch offices." The CDN software executing in the customer data center typically provides service configuration, service management, service reporting, remote management access, customer SSL certificate management, as well as other functions for configured web applications. The software executing in the branch offices provides last mile web acceleration for users located there. The CDN itself typically provides CDN hardware hosted in CDN data centers to provide a gateway between the nodes running behind the customer firewall and the CDN service provider's other infrastructure (e.g., network and operations facilities). This type of managed solution provides an enterprise with the opportunity to take advantage of CDN technologies with respect to their company's intranet, providing a wide-area-network optimization solution. This kind of solution extends acceleration for the enterprise to applications served anywhere on the Internet. By bridging an enterprise's CDN-based private overlay network with the existing CDN public internet overlay network, an end user at a remote branch office obtains an accelerated application end-to-end.

The CDN may have a variety of other features and adjunct components. For example the CDN may include a network storage subsystem (sometimes referred to herein as "Net-Storage") which may be located in a network datacenter accessible to the CDN servers, such as described in U.S. Pat. No. 7,472,178, the disclosure of which is incorporated herein by reference. The CDN may operate a server cache hierarchy to provide intermediate caching of customer content; one such cache hierarchy subsystem is described in U.S. Pat. No. 7,376,716, the disclosure of which is incorporated herein by reference. Communications between CDN servers and/or across the overlay may be enhanced or improved using techniques such as described in U.S. Pat. Nos. 6,820,133, 7,274,658, 7,660,296, the disclosures of which are incorporated herein by reference.

For live streaming delivery, the CDN may include a live delivery subsystem, such as described in U.S. Pat. No. 7,296,082, and U.S. Publication No. 2011/0173345, the disclosures of which are incorporated herein by reference.

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

Systems and methods for client-side authentication, particularly in the context of a CDN, are described in U.S. Pat. No. 8,560,834, the teachings of which are hereby incorporated by reference in their entirety. Systems and method for reducing resources associated with TCP connections, in the context of a CDN, and otherwise, are described in U.S. Pat. No. 8,875,287, the teachings of which are incorporated by reference in their entirety.

Computer Based Implementation

The clients, host computers (also referred to as servers or server machines), and other devices described herein may be implemented with conventional computer systems, as modified by the teachings hereof, with the functional characteristics described above realized in special-purpose hardware, general-purpose hardware configured by software stored therein for special purposes, or a combination thereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code, such as the "interpreter" referenced above.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 8:
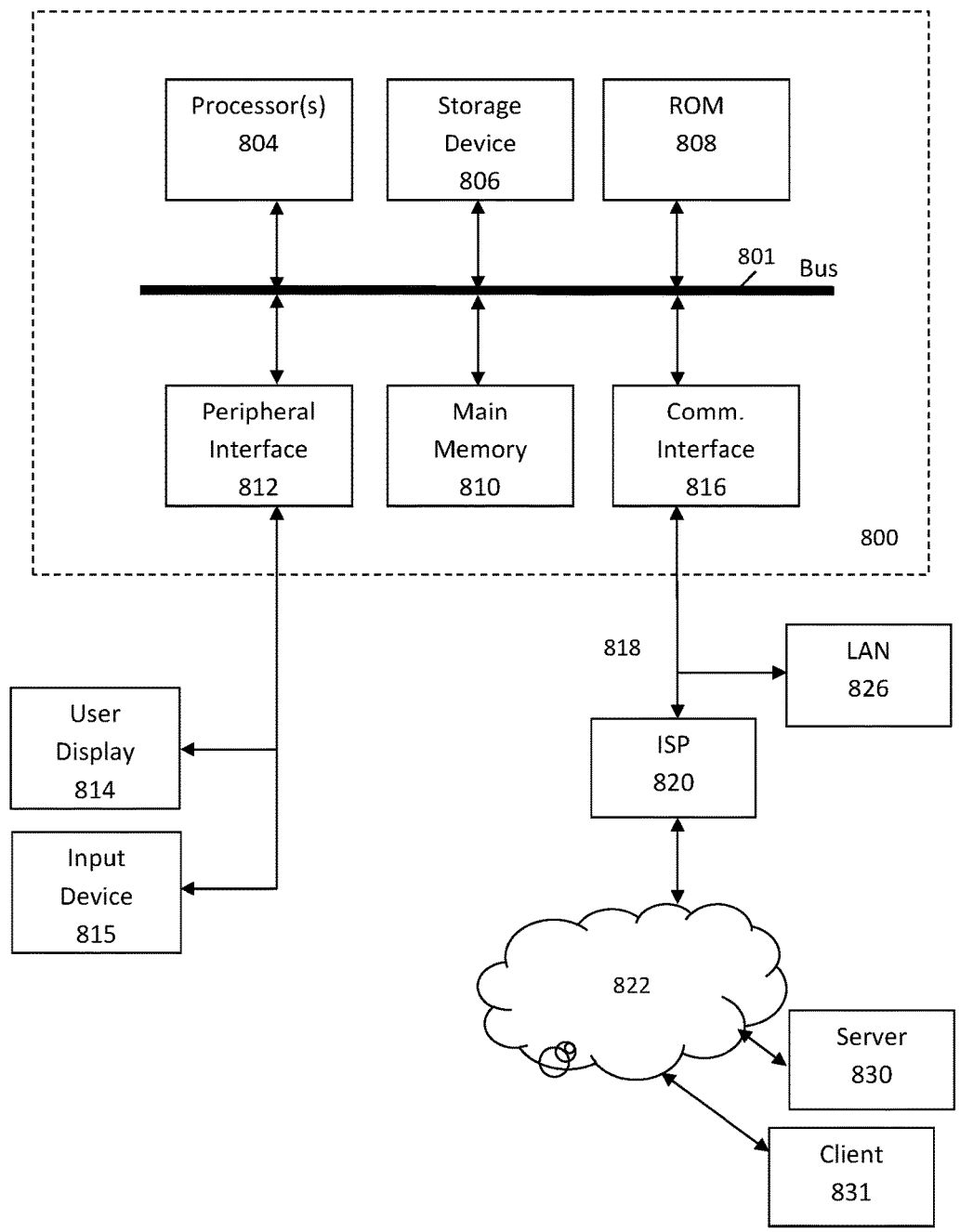

FIG. 8 is a block diagram that illustrates hardware in a computer system 800 upon which such software may run in order to implement embodiments of the invention. The computer system 800 may be embodied in a client device, server, personal computer, workstation, tablet computer, mobile or wireless device such as a smartphone, network device, router, hub, gateway, or other device. Representative machines on which the subject matter herein is provided may be Intel Pentium-based computers running a Linux or Linux-variant operating system and one or more applications to carry out the described functionality.

Computer system 800 includes circuitry forming a microprocessor 804 that is coupled to bus 801. In some systems, multiple processor and/or processor cores may be employed. Computer system 800 further includes a main memory 810, such as a random access memory (RAM) or other storage device, coupled to the bus 801 for storing information and instructions to be executed by processor 804. A read only memory (ROM) 808 is coupled to the bus 801 for storing information and instructions for processor 804. A non-volatile storage device 806, such as a magnetic disk, solid state memory (e.g., flash memory), or optical disk, is provided and coupled to bus 801 for storing information and instructions. Other application-specific integrated circuits (ASICs), field programmable gate arrays (FPGAs) or circuitry may be included in the computer system 800 to perform functions described herein.

A peripheral interface 812 communicatively couples computer system 800 to a user display 814 that displays the output of software executing on the computer system, and an input device 815 (e.g., a keyboard, mouse, trackpad, touchscreen) that communicates user input and instructions to the computer system 800. The peripheral interface 812 may include interface circuitry, control and/or level-shifting logic for local buses such as RS-485, Universal Serial Bus (USB), IEEE 1394, or other communication links.

Computer system 800 is coupled to a communication interface 817 that provides a link (e.g., at a physical layer, data link layer, or otherwise) between the system bus 801 and an external communication link. The communication interface 816 provides a network link 818. The communication interface 816 may represent a Ethernet or other network interface card (NIC), a wireless interface, modem, an optical interface, or other kind of input/output interface.

Network link 818 provides data communication through one or more networks to other devices. Such devices include other computer systems that are part of a local area network (LAN) 826. Furthermore, the network link 818 provides a link, via an internet service provider (ISP) 820, to the Internet 822. In turn, the Internet 822 may provide a link to other computing systems such as a remote server 830 and/or a remote client 831. Network link 818 and such networks may transmit data using packet-switched, circuit-switched, or other data-transmission approaches.

In operation, the computer system 800 may implement the functionality described herein as a result of the processor executing code. Such code may be read from or stored on a non-transitory computer-readable medium, such as memory 810, ROM 808, or storage device 806. Other forms of non-transitory computer-readable media include disks, tapes, magnetic media, CD-ROMs, optical media, RAM, PROM, EPROM, and EEPROM. Any other non-transitory computer-readable medium may be employed. Executing code may also be read from network link 818 (e.g., following storage in an interface buffer, local memory, or other circuitry).

Trademarks appearing herein are the property of their respective owners and used for identification and descriptive purposes only, given the nature of the subject matter at issue, and not to imply endorsement or affiliation in any way.

The invention claimed is:

1. A method performed by a host computer comprising a microprocessor and memory storing computer instructions for execution by the at least one microprocessor to provide a plurality of services to clients, the plurality of services including a first service provided by a first application and a second service provided by a second application, and to provide an operating system that manages network traffic between clients and the plurality of services, the network traffic comprising transport layer protocol messages, the method comprising:

receiving one or more transport layer messages from a client specifying a particular destination port number;

in response to the one or more transport layer messages, executing a transport layer security (TLS) protocol handshake with the client, wherein said TLS handshake comprises the host computer sending a certificate request to the client, so as to authenticate the client;

based at least in part upon a determination by the host computer that the client responded to the certificate request by any of: failing to provide a certificate and providing an empty certificate, the host computer:

(i) responding to any client requests for the first service by providing the first service, wherein providing the first service comprises sending the client one or more application layer messages from the first application within one or more transport layer messages with a source port number that is the same as the particular destination port number, and (ii) responding to any client requests for the second service with any of: an error message and no response;

based at least in part upon a determination by the host computer that the client responded to the certificate request with a valid certificate, and upon completion of said TLS handshake as a valid, signed TLS handshake, the host computer:
  (iii) responding to any client requests for the second service by providing the second service, wherein providing the second service comprises sending the client one or more application layer messages from the second application within one or more transport layer messages with a source port number that is the same as the particular destination port number.

2. The method of claim 1, wherein client requests for the first service comprise one or more application layer messages within one or more transport layer messages that specify the particular destination port, and client requests for the second service comprise one or more application layer messages within one or more transport layer messages that specify the particular destination port.

3. The method of claim 1, wherein the host computer (iii) responds to any client requests for the second service by providing the second service, based at least in part upon a determination by the host computer to trust a signing authority for the certificate, in addition to the determination that the client responded to the certificate request with a valid certificate.

4. The method of claim 1, wherein the host computer (iii) responds to any client requests for the second service by providing the second service, based at least in part upon authorization of the client by the host computer, in addition to the determination that the client responded to the certificate request with a valid certificate.

5. The method of claim 1, wherein the particular destination port number is any of: a well-known port for the first service, and a registered port for the first service.

6. The method of claim 1, wherein the particular destination port number is for HTTPS service.

7. The method of claim 1, wherein the second service is a VPN service.

8. An apparatus comprising:
  a host computer comprising a microprocessor and memory storing computer instructions for execution by the at least one microprocessor to provide a plurality of services to clients, the plurality of services including a first service provided by a first application and a second service provided by a second application, and to provide an operating system that manages network communication traffic between clients and the plurality of services, the network communication traffic comprising transport layer protocol messages, the computer instructions comprising that when executed cause the host computer to:
  receive one or more transport layer messages from a client specifying a particular destination port number;
  in response to the one or more transport layer messages, execute a transport layer security (TLS) protocol handshake with the client, wherein said execution of said TLS handshake comprises the host computer sending a certificate request to the client, so as to authenticate the client;
  based at least in part upon a determination by the host computer that the client responded to the certificate request by any of: failing to provide a certificate and providing an empty certificate:
    (i) respond to any client requests for the first service by providing the first service, wherein providing the first service comprises sending the client one or more application layer messages from the first application within one or more transport layer messages with a source port number that is the same as the particular destination port number, and
    (ii) respond to any client requests for the second service with any of: an error message and no response;
  based at least in part upon a determination by the host computer that the client responded to the certificate request with a valid certificate, and upon completion of said TLS handshake as a valid, signed TLS handshake:
    (iii) respond to any client requests for the second service by providing the second service, wherein providing the second service comprises sending the client one or more application layer messages from the second application within one or more transport layer messages with a source port number that is the same as the particular destination port number.

9. The apparatus of claim 8, wherein client requests for the first service comprise one or more application layer messages within one or more transport layer messages that specify the particular destination port number, and client requests for the second service comprise one or more application layer messages within one or more transport layer messages that specify the particular destination port number.

10. The apparatus of claim 8, wherein the particular destination port number is any of: a well-known port for the first service, and a registered port for the first service.

11. A method performed by a host computer comprising a microprocessor and memory storing computer instructions for execution by the at least one microprocessor to provide a plurality of services to clients, the plurality of services including a first service provided by a first application and a second service provided by a second application, and to provide an operating system that manages network communication traffic between clients and the plurality of services, the network communication traffic comprising transport layer protocol messages, the method comprising:
  receiving first one or more transport layer messages from a first client specifying a particular destination port number;
  in response to the first one or more transport layer messages, executing a first transport layer security (TLS) protocol handshake with the first client, wherein said first TLS handshake comprises the host computer sending a first certificate request the first client, so as to authenticate the first client;
  receiving an empty certificate from the first client;
  based at least in part on the receipt of the empty certificate:
    (i) responding to any first client requests for the first service by providing the first service, wherein providing the first service comprises sending the first client one or more application layer messages from the first application within one or more transport layer messages with a source port number that is the same as the particular destination port number, and
    (ii) responding to any first client requests for the second service with any of: an error message and no response;
  receiving second one or more transport layer messages from a second client specifying the same particular destination port number;
  in response to the second one or more transport layer messages, executing a second transport layer security (TLS) protocol handshake with the second client, wherein said second TLS handshake comprises the host computer sending a second certificate request the second client, so as to authenticate the second client;

based at least in part on the second client responding to the second certificate request with a certificate with a non-zero content length, and upon completion of said second TLS handshake as a valid, signed TLS handshake:
- (iii) responding to any second client requests for the second service by providing the second service, wherein providing the second service comprises sending the second client one or more application layer messages from the second application within one or more transport layer messages with a source port number that is the same as the particular destination port number.

12. The method of claim 11, wherein first client requests for the first service comprise one or more application layer messages within one or more transport layer messages that specify the particular destination port number, and second client requests for the second service comprise one or more application layer messages within one or more transport layer messages that specify the particular destination port number.

13. The method of claim 11, wherein the host computer (iii) responds to any second client requests for the second service by providing the second service, based at least in part upon a determination by the host computer that the certificate is valid, in addition to the determination that the second client responded to the certificate request with a certificate with a non-zero content length.

14. The method of claim 11, wherein the host computer (iii) responds to any client requests for the second service by providing the second service, based at least in part upon authorization of the second client by the host computer, in addition to the determination that the second client responded to the certificate request with a certificate with a non-zero content length.

15. The method of claim 11, wherein the particular destination port number is any of: a well-known port for the first service, and a registered port for the first service.

16. The method of claim 11, wherein the first service is an HTTPS service.

17. The method of claim 11, wherein the second service is a VPN service.

18. A system, comprising:
- a host computer comprising a microprocessor and memory storing computer instructions for execution by the at least one microprocessor to provide a plurality of services to clients, the plurality of services including a first service provided by a first application and a second service provided by a second application, and to provide an operating system that manages network communication traffic between clients and the plurality of services, the network communication traffic comprising transport layer protocol messages, the computer instructions comprising instructions that when executed cause the host computer to:
  - receive first one or more transport layer messages from a first client specifying a particular destination port number;
  - in response to the first one or more transport layer messages, execute a first transport layer security (TLS) protocol handshake with the first client, wherein said first TLS handshake comprises the host computer sending a first certificate request the first client, so as to authenticate the first client;
  - receive an empty certificate from the first client;
  - based at least in part on the receipt of the empty certificate:
    - (i) respond to any first client requests for the first service by providing the first service, wherein providing the first service comprises sending the first client one or more application layer messages from the first application within one or more transport layer messages with a source port number that is the same as the particular destination port number, and
    - (ii) respond to any first client requests for the second service with any of: an error message and no response;
  - receive second one or more transport layer messages from a second client specifying the same particular destination port number;
  - in response to the second one or more transport layer messages, execute a second transport layer security (TLS) protocol handshake with the second client, wherein said second TLS handshake comprises the host computer sending a second certificate request the second client, so as to authenticate the second client;
  - based at least in part on the second client responding to the second certificate request with a certificate with a non-zero content length, and upon completion of said second TLS handshake as a valid, signed TLS handshake:
    - (iii) respond to any second client requests for the second service by providing the second service, wherein providing the second service comprises sending the second client one or more application layer messages from the second application within one or more transport layer messages with a source port number that is the same as the particular destination port number.

19. The system of claim 18, wherein first client requests for the first service comprise one or more application layer messages within one or more transport layer messages that specify the particular destination port number, and second client requests for the second service comprise one or more application layer messages within one or more transport layer messages that specify the particular destination port number.

20. The system of claim 18, wherein the particular destination port number is any of: a well-known port for the first service, and a registered port for the first service.

* * * * *